(12) United States Patent
Crews, Jr. et al.

(10) Patent No.: US 11,861,613 B2
(45) Date of Patent: Jan. 2, 2024

(54) SYSTEMS AND METHODS FOR IDENTIFYING A SECONDARY CARD USER

(71) Applicant: Capital One Services, LLC, McLean, VA (US)

(72) Inventors: James Holt Crews, Jr., Washington, DC (US); Cruz Vargas, Denver, CO (US); Viraj Chaudhary, Katy, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 105 days.

(21) Appl. No.: 17/494,750

(22) Filed: Oct. 5, 2021

(65) Prior Publication Data
US 2023/0107711 A1 Apr. 6, 2023

(51) Int. Cl.
*G06Q 20/40* (2012.01)

(52) U.S. Cl.
CPC .................................. *G06Q 20/401* (2013.01)

(58) Field of Classification Search
CPC ................................................... G06Q 20/401
See application file for complete search history.

(56) References Cited

U.S. PATENT DOCUMENTS

| | | | |
|---|---|---|---|
| 9,911,116 B1 * | 3/2018 | Lewis | G06Q 20/204 |
| 10,482,453 B2 | 11/2019 | Zarakas et al. | |
| 11,037,165 B2 | 6/2021 | Perezleon et al. | |
| 11,087,326 B2 | 8/2021 | Koeppel et al. | |
| 2013/0212006 A1 * | 8/2013 | Siddens | G06Q 20/381 |
| | | | 705/39 |
| 2019/0116187 A1 * | 4/2019 | Gahnoog | H04L 67/10 |
| 2019/0325453 A1 * | 10/2019 | Koeppel | G07F 7/0833 |
| 2020/0019950 A1 * | 1/2020 | Poole | G06Q 20/34 |
| 2020/0043004 A1 * | 2/2020 | Wurmfeld | G06F 1/32 |
| 2020/0111096 A1 * | 4/2020 | Liu | H04L 67/55 |
| 2020/0349600 A1 * | 11/2020 | Kurian | G06Q 30/0641 |
| 2021/0065178 A1 * | 3/2021 | Rudden | G06Q 20/363 |
| 2021/0264432 A1 * | 8/2021 | Devdas | G06Q 20/4016 |
| 2022/0132208 A1 * | 4/2022 | Garg | H04N 21/4532 |

* cited by examiner

*Primary Examiner* — Gregory S Cunningham, II
*Assistant Examiner* — Raven E Yono
(74) *Attorney, Agent, or Firm* — TROUTMAN PEPPER HAMILTON SANDERS LLP; Christopher J. Forstner; John A. Morrissett

(57) ABSTRACT

A system may receive transaction information associated with a transaction, the transaction information comprising an account number associated with a first user. The system may determine whether the transaction is associated with a second user. Responsive to determining the transaction is associated with the second user, the system may transmit a first prompt to a first user device associated with the first user, the first prompt comprising a request to confirm or deny the transaction. The system may receive, via the first user device, a first user selection confirming the transaction. Responsive to receiving the first user selection, the system may determine whether the transaction exceeds a predetermined threshold. Responsive to determining the transaction exceeds the predetermined threshold, the system may transmit a second prompt to the first user device, the second prompt comprising a recommendation to designate the second user as an authorized user of the account number.

17 Claims, 5 Drawing Sheets

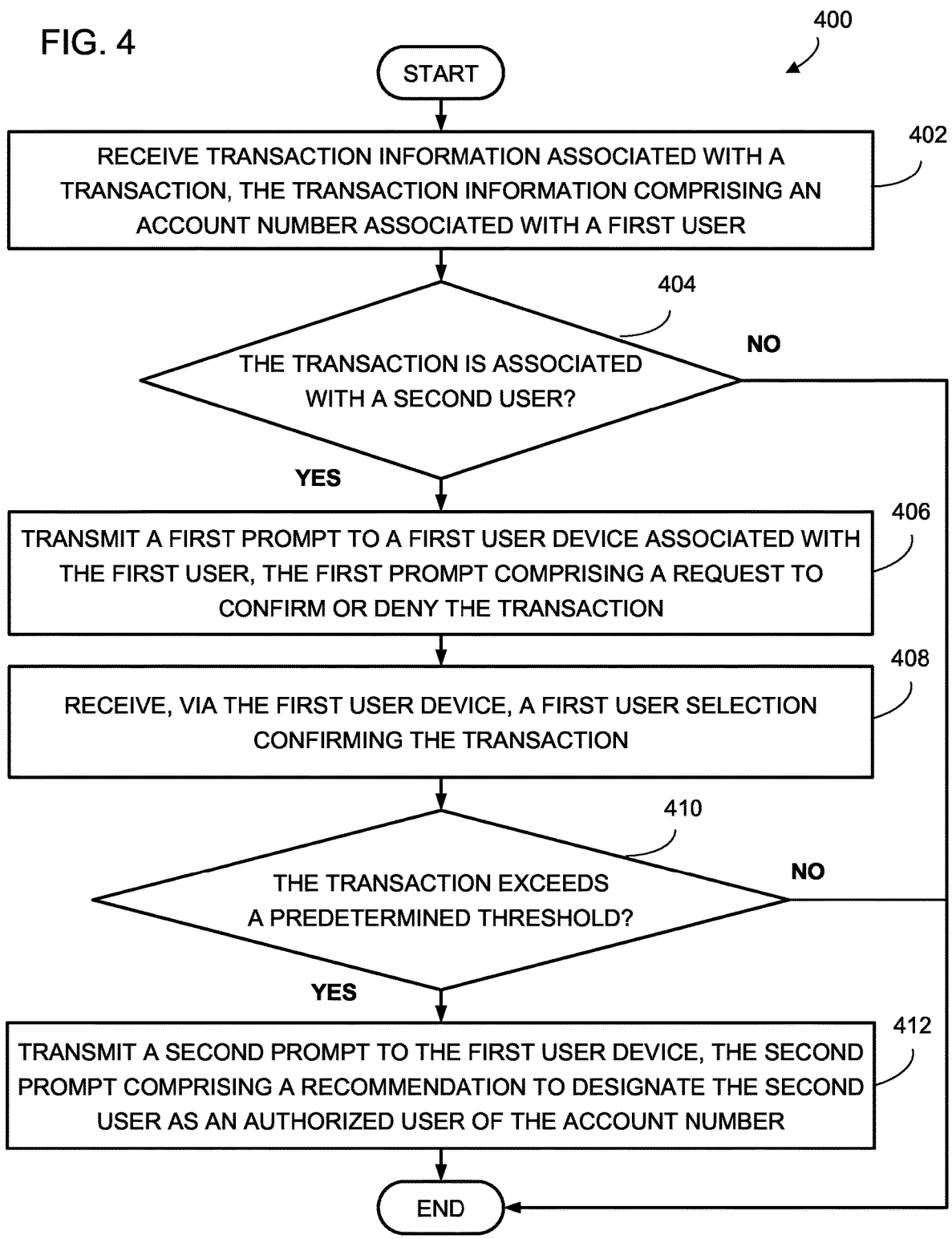

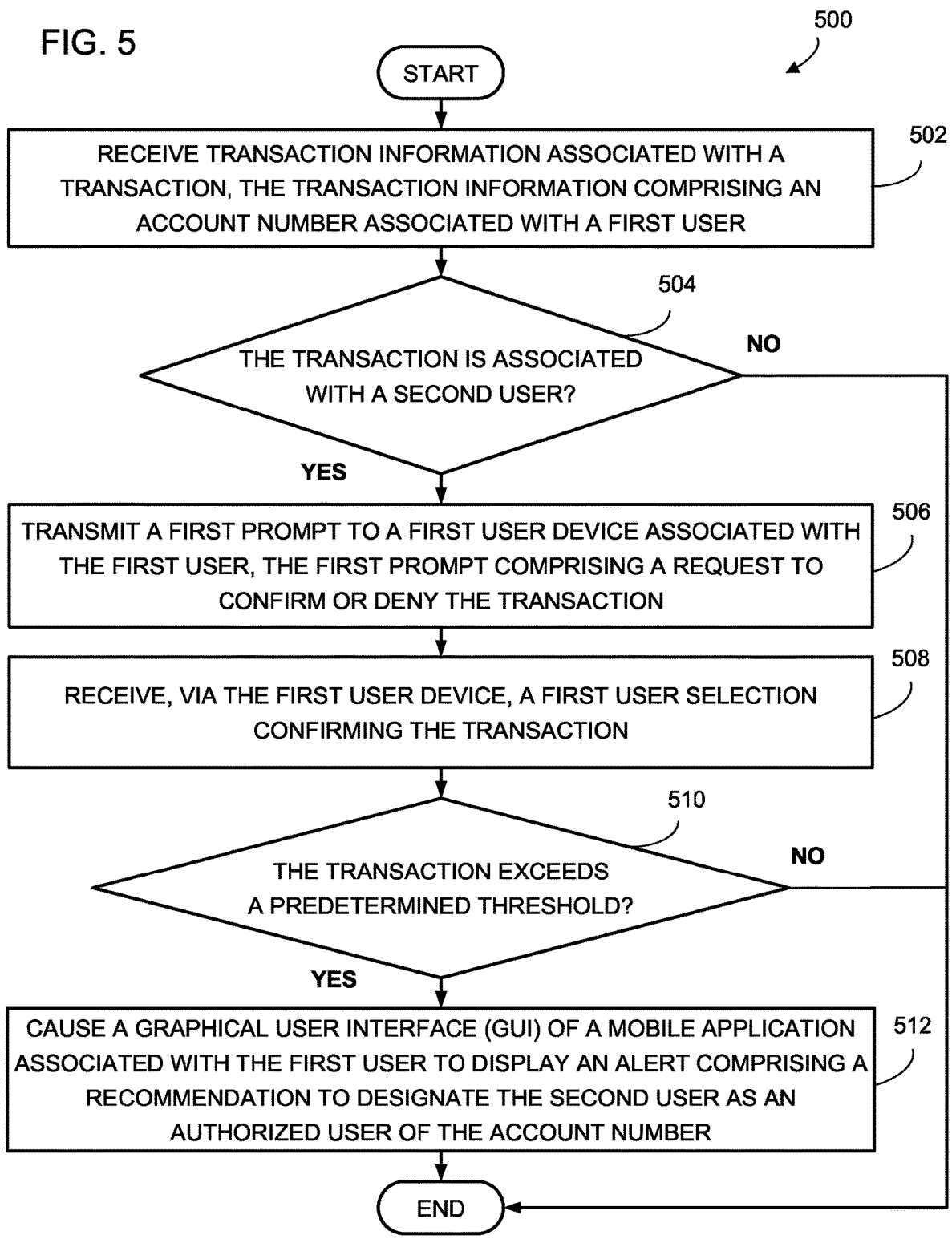

SYSTEMS AND METHODS FOR IDENTIFYING A SECONDARY CARD USER

FIELD

The present disclosure relates generally to systems and methods for identifying a secondary card user, and more particularly to identifying a secondary card user based on user preferences and biometric information.

BACKGROUND

A primary account holder may permit a secondary user to borrow the primary account holder's credit card for conducting certain transactions during certain periods of time. For example, a parent may allow a child to use the parent's credit card for purchasing clothing or school supplies. During these periods of card borrowing, traditional systems and methods are typically unable to identify that a card is being used by a secondary card user. One disadvantage of this lack of identification is that the secondary user may not reap any benefit of using the primary account holder's card from a credit history perspective. That is, any transactions conducted by the secondary user will default toward the primary account holder's credit history such that the secondary user is unable to start building his or her own credit history before applying for a separate credit card. For example, a child borrowing a parent's credit card would not be able to build his or her own credit history. Thus, when the child goes to apply for his or her own credit card, for example when the child goes off to college, financial institutions may be unwilling to provide the child with his or her own credit card.

Another disadvantage of traditional systems and methods being unable to identify a secondary card user is that a card may be left vulnerable to fraudsters. While financial institutions provide certain methods for fraud identification (e.g., identifying when card users are traveling), these methods typically provide many gaps through which fraudsters may still navigate.

Accordingly, there is a need for improved systems and methods for identifying a secondary card user. Embodiments of the present disclosure are directed to this and other considerations.

SUMMARY

Disclosed embodiments may include a system for identifying a secondary card user. The system may include one or more processors, and memory in communication with the one or more processors and storing instructions that are configured to cause the system to perform a method for identifying a secondary card user. The system may receive transaction information associated with a transaction, the transaction information comprising an account number associated with a first user (i.e., a primary account holder). The system may determine, e.g., by using a machine learning model (MLM), whether the transaction is associated with a second user. Responsive to determining the transaction is associated with the second user, the system may transmit a first prompt to a first user device associated with the first user, the first prompt comprising a request to confirm or deny the transaction. The system may receive, via the first user device, a first user selection confirming the transaction. Responsive to receiving the first user selection confirming the transaction, the system may determine whether the transaction exceeds a predetermined threshold. Responsive to determining the transaction exceeds the predetermined threshold, the system may transmit a second prompt to the first user device, the second prompt comprising a recommendation to designate the second user as an authorized user of the account number.

In another embodiment, the system may include one or more processors, and memory in communication with the one or more processors and storing first instructions that are configured to cause the system to perform a method for identifying a secondary card user. The system may receive transaction information associated with a transaction, the transaction information comprising an account number associated with a first user (i.e., a primary account holder). The system may determine, using an MLM, whether the transaction is associated with a second user. Responsive to determining the transaction is associated with the second user, the system may transmit a first prompt to a first user device associated with the first user, the first prompt comprising a request to confirm or deny the transaction. The system may receive, via the first user device, a first user selection confirming the transaction. Responsive to receiving the first user selection confirming the transaction, the system may determine whether the transaction exceeds a predetermined threshold. Responsive to determining the transaction exceeds the predetermined threshold, the system may cause a graphical user interface (GUI) of a mobile application associated with the first user to display an alert comprising a recommendation to designate the second user as an authorized user of the account number.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIG. 4 is a flow diagram illustrating an exemplary method for identifying a secondary card user, in accordance with certain embodiments of the disclosed technology.

FIG. 5 is a flow diagram illustrating an exemplary method for identifying a secondary card user, in accordance with certain embodiments of the disclosed technology.

DETAILED DESCRIPTION

Examples of the present disclosure relate to systems and methods for identifying a secondary card user. In particular, the disclosed technology relates to systems and methods for receiving transaction information associated with a transaction, wherein the transaction information comprises an account number associated with a first user; determining whether the transaction is associated with a second user, and if so, prompting the first user to confirm or deny the transaction; determining whether the transaction exceeds a predetermined threshold, and if so, recommending the first user designate the second user as an authorized user of the account number. The systems and methods described herein are necessarily rooted in computer and technology as they utilize MLMs to identify characteristics of a card user (e.g., purchase history, merchant preferences, biometric information, etc.). Machine learning models are a unique computer technology that involves training the models to complete tasks, such as labeling, categorizing, identifying, or determining whether user inputs and/or preferences correspond to a certain user's identity so the MLMs learn how to label, categorize, identify, or determine whether a first user or a second user, for example, is using an account for conducting transactions. Importantly, examples of the present disclosure improve the speed with which computers can perform these automated tasks, by reducing the amount of data necessary to properly train the MLMs to make such determinations.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
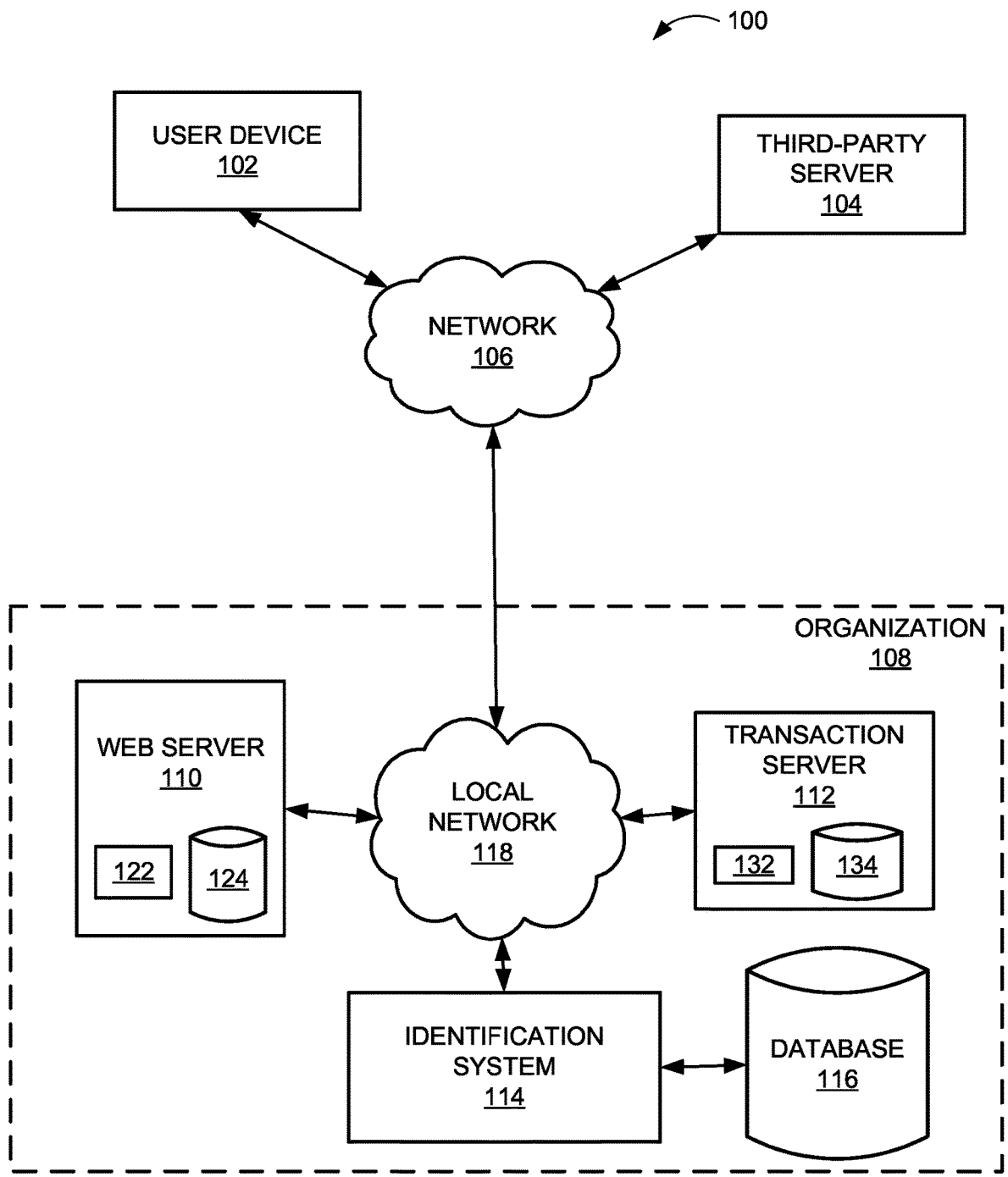
FIG. 1 is a block diagram of an example system that may be used to identify a secondary card user, according to an example implementation of the disclosed technology.

FIG. 1 is a diagram of an example system 100 that may be configured to perform one or more processes that may identify whether a card user is a first or second card user. The components and arrangements shown in FIG. 1 are not intended to limit the disclosed embodiments as the components used to implement the disclosed processes and features may vary. As shown, system 100 may include a user device 102 which may be connected to an organization 108 via a network 106. Organization 108 may include, for example, a web server 110, a transaction server 112, identification system 114, a database 116, and a local network 118. In some embodiments, system 100 may include a third-party server 104, which may be connected to network 106.

According to some embodiments, organization 108 may be associated with an entity such as a business, corporation, individual, partnership, or any entity that may provide financial services or processing of financial transactions such as a bank, a credit card company, or the like. According to some embodiments, organization 108 may be associated with an entity that provides goods and services. According to some embodiments, third-party server 104 may be associated with an entity such as a business, corporation, individual, partnership, or any entity that may provide financial services or processing of financial transactions such as a bank, a credit card company, or the like. In some embodiments, third-party server 104 and organization 108 may be associated with the same or related entities. Accordingly, although organization 108 and third-party server 104 are shown as being separate in FIG. 1, it should be understood that in some embodiments, some or all of the elements of organization 108 and third-party server 104 may be combined together into a single organization and/or into one or more components.

In some embodiments, a customer may operate user device 102, as described further below with respect to FIG. 2. User device 102 may include one or more of a transaction card, a mobile device, smart phone, tablet computer, laptop computer, smart wearable device, voice command device, other mobile computing device, or any other device capable of communicating with network 106, third-party server 104, and/or with one or more components of organization 108. Users of user device 102 may include individuals such as, for example, subscribers, clients, prospective clients, or customers of an entity associated with organization 108 and/or third-party server 104. According to some embodiments and as described more fully below, user device 102 may include one or more of: an environmental sensor for obtaining audio or visual data (e.g., a microphone and/or digital camera), one or more biometric sensors for obtaining biometric data from a user (e.g., walking speed, gait, movement patterns, heartrate data, blood pressure data, hormonal data, body temperature data, retinal data, iris data, voice data, respiratory data, brainwave data, olfactory data, sweat data), a geographic location sensor for determining the location of the device, an input/output device such as a transceiver for sending and receiving data (e.g., via WIFI technology, cellular communications, near-field communication (NFC), BLUETOOTH technology, and the like), a display for displaying digital images, one or more processors, and a memory in communication with the one or more processors.

Network 106 may be of any suitable type, including individual connections via the internet such as cellular or WiFi networks. In some embodiments, network 106 may connect terminals, services, and mobile devices using direct connections such as radio-frequency identification (RFID), NFC, BLUETOOTH technology, LOW ENERGY BLUETOOTH technology (BLE), WIFI technology, ZIGBEE protocols, ambient backscatter communications (ABC) protocols, universal serial bus (USB), wide area network (WAN), or local area network (LAN). Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may include any type of computer networking arrangement used to exchange data. For example, network 106 may be the Internet, a private data network, virtual private network using a public network, and/or other suitable connection(s) that enable(s) components in the system 100 environment to send and receive information between the components of system 100. Network 106 may also include a public switched telephone network ("PSTN") and/or a wireless network.

Figure 2:
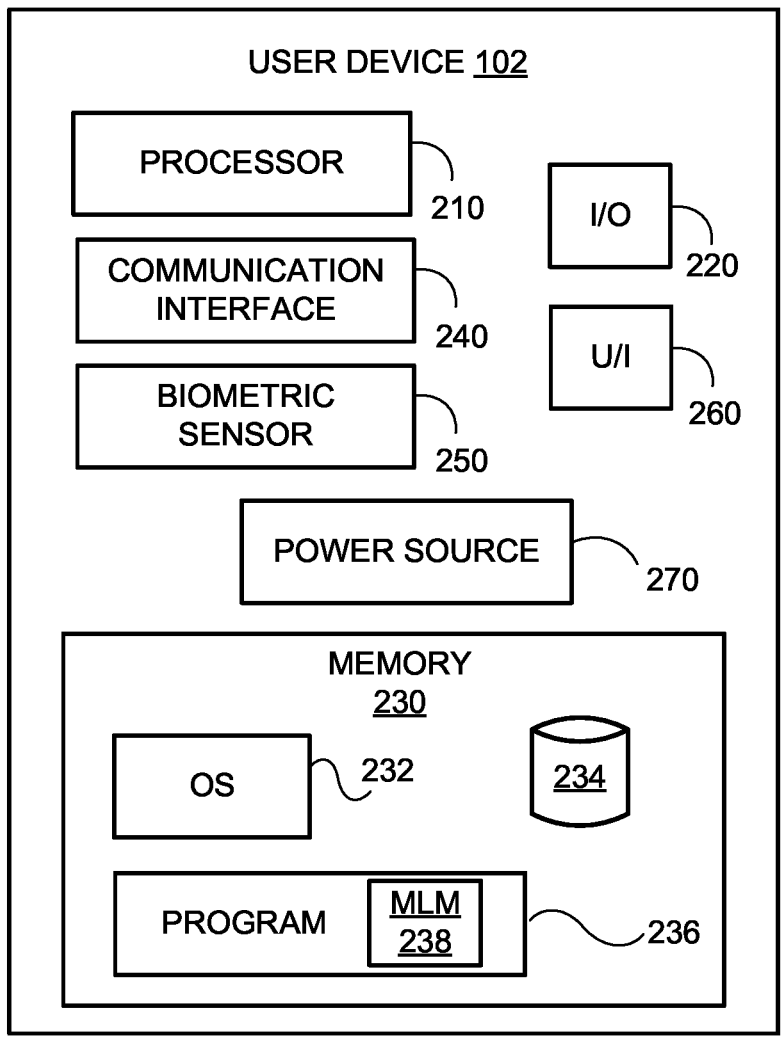
FIG. 2 is a component diagram of an example user device, in accordance with certain embodiments of the disclosed technology.

An example embodiment of user device 102 is shown in more detail in FIG. 2. As shown, user device 102 may include a processor 210; an input/output (I/O) device 220; a memory 230, which may contain an operating system (OS) 232, a storage device 234, which may be any suitable repository of data, and a program 236; a communication interface 240; a biometric sensor 250; a user interface (U/I); and a power source 270. In some embodiments, program 236 may include an MLM 238 that may be trained, for example, to receive user information (e.g., merchant identifiers or preferences, biometric data, etc.), and compare the received user information to stored or previously associated user information to identify a current user. In certain implementations, MLM 238 may issue commands in response to processing an event, in accordance with a model that may be continuously or intermittently updated. Moreover, processor 210 may execute one or more programs (such as via a rules-based platform or the trained MLM 238), that, when executed, perform functions related to disclosed embodiments.

Processor 210 may include one or more of an application specific integrated circuit (ASIC), programmable logic device, microprocessor, microcontroller, digital signal processor, co-processor or the like or combinations thereof capable of executing stored instructions and operating upon stored data. Memory 230 may include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including operating system 232, application programs 236 (including, for example, a web browser application, a widget or gadget engine, and/or other applications, as necessary), executable instructions and data. In some embodiments, processor 210 may include a secure microcontroller, which may be configured to transmit and/or facilitate payment transactions and/or cryptography. In some embodiments, processor 210 may comprise a single secure microcontroller configured to transmit and/or facilitate payment, encrypt and/or decrypt data, and/or process any other program instructions. In some embodiments, processor 210 may include one or more secure microcontrollers and/or other processing devices such that one or more secure microcontroller is configured to transmit and/or facilitate payment and/or encrypt and/or decrypt data, while one or more other processing device is configured to process any other program instructions. In some embodiments, some or all of the processing techniques described herein can be implemented as a combination of executable instructions and data within memory 230.

Processor 210 may be one or more known processing devices, such as a microprocessor from the PENTIUM microprocessor family manufactured by INTEL company or the TURION processor family manufactured by AMD company. Processor 210 may constitute a single-core or multiple-core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc., multiple software processes, applications, programs, etc. One of ordinary skill in the art would understand that other types of processor arrangements could be implemented that provide for the capabilities disclosed herein.

Communication interface 240 may include a transceiver. In some embodiments, user device 102 may further include a peripheral interface, a mobile network interface in communication with processor 210, a bus configured to facilitate communication between the various components of user device 102, and/or a power source configured to power one or more components of user device 102. In certain embodiments, user device 102 may include a geographic location sensor (GLS) for determining the geographic location of user device 102.

Biometric sensor 250 may be one or more biometric sensors that are configured to detect and/or measure one or more types of biological information. For example, biometric sensor 250 may be configured to measure one or more of a user's walking speed, gait, movement patterns, heartrate, blood pressure, hormone levels, body temperature, ocular characteristics (e.g., size, shape, color, and/or other characteristics associated with a user's retina, iris, and/or pupil), voice, respiratory rate (e.g., breathing rate), brainwaves, odor (i.e., olfactory data), and sweat (e.g., amount produced, rate of production, molecular composition). Those having skill in the art will understand that the disclosed technology contemplates any and all sensors configured to measure biological information, including those not yet created, and is not restricted to those types of biological information expressly recited herein. In some embodiments, user device 102 may include a microphone and/or an image capture device, such as a digital camera. In certain embodiments, user device 102 may include one or more sensors configured to measure environmental data, such as ambient temperature (e.g., by a thermometer or thermocouple), ambient humidity (e.g., by a hygrometer), local wind speed (e.g., by an anemometer, manometer, or pressure transducer), or any other environmental data that may be useful for the methods and techniques disclosed herein.

User device 102 may include U/I device 260 for receiving user input data, such as data representative of a click, a scroll, a tap, a press, a spatial gesture (e.g., as detected by one or more accelerometers and/or gyroscopes), or typing on an input device that can detect tactile inputs.

User device 102 may include power source 270, which may be a component configured to receive power from an external power source, such as a capacitor, battery, solar powered panel, etc. In some embodiments, power source 270 may be configured to charge when user device 102 connects with a computer terminal. In some embodiments, power source 270 may be configured to charge wirelessly via an inductive charging coil when user device 102 is placed within an electromagnetic field.

In some embodiments, user device 102 may include a peripheral interface, which may include the hardware, firmware, and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a USB, a micro-USB port, a high-definition multimedia (HDMI) port, a video port, an audio port, a BLUETOOTH technology port, an NFC port, another like communication interface, or any combination thereof.

In some embodiments, a transceiver may be configured to communicate with compatible devices and ID tags when they are within a predetermined range. A transceiver may be compatible with one or more of: RFID, NFC, BLUETOOTH technology, BLE (e.g., BLE mesh and/or thread), WIFI technology, ZIGBEE protocols, ABC protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public. A power source may be configured to provide an appropriate alternating current (AC) or direct current (DC) to power components.

As described above, user device 102 may be configured to remotely communicate with one or more other devices, such as organization 108 and/or third-party server 104. In some embodiments, user device 102 may be configured to communicate with one or more devices via network 106. In some embodiments, user device 102 may be configured to detect one or more other user devices associated with a user (e.g., via NFC, BLUETOOTH technology, BLE, etc.) and communicate the presence of those other user device(s) to one or more other devices of system 100, such as organization 108 and/or third-party server 104. In some embodiments, user device 102 may be configured to detect and transmit biometric data indicative of biological information associated with a user, such as to one or more other devices of system 100 (e.g., organization 108 and/or third-party server 104).

User device 102 may include one or more storage devices 234 configured to store information used by processor 210 (or other components) to perform certain functions related to the disclosed embodiments. As an example, user device 102 may include memory 230 that includes instructions to enable processor 210 to execute one or more applications, network communication processes, and any other type of application or software known to be available on computer systems. Alternatively, the instructions, application programs, etc., may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, user device 102 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, user device 102 may include memory 230 that may include one or more programs 236 to perform one or more functions of the disclosed embodiments. Moreover, processor 210 may execute one or more programs 236 located remotely from, for example and not in limitation, web server 110, transaction server 112, or identification system 114. For example, user device 102 may access one or more remote programs 236, that, when executed, perform functions related to one or more disclosed embodiments. In some embodiments, one or more programs 236 may be configured to detect and/or measure biological information associated with a user, which may include, but is not limited to, a user's walking speed, gait, movement patterns, heartrate, blood pressure, hormone levels, body temperature, retina, iris, pupil, voice, respiratory rate (e.g., breathing rate), brainwaves, odor, and/or sweat.

According to some embodiments, program(s) 236 may be configured to detect and/or obtain baseline user information associated with a user (e.g., biometric information, merchant preferences, purchase history, other known associated device(s), etc.). In certain embodiments, program(s) 236 may be configured to provide a request (e.g., audibly or via a display associated with user device 102) for a user to provide baseline user information. In some embodiments, program(s) 236 may be configured to receive an indication from the user to begin recording biometric data that can be used as baseline biometric data. According to some embodiments, program(s) 236 may be configured to record biometric data that can be used as baseline biometric data for a predetermined amount of time. For example, program(s) 236 may be configured to record biometric data for 1 minute, 5 minutes, 30 minutes, 1 hour, 2 hours, 1 day, or any amount of time desired, required, or deemed necessary to provide a sufficient amount of baseline data. In certain embodiments, program(s) 236 may be configured to record biometric data that can be used as baseline biometric data until indication from the user to stop recording has been received. In some embodiments, user device 102 may determine one or more ranges of baseline biometric data, which may be based at least in part on the obtained baseline biometric data. In some embodiments, user device 102 may store the baseline biometric data and/or the one or more ranges of baseline biometric data locally.

In certain embodiments, program(s) 236 may be configured to update baseline user information on a regular or semi-regular basis. For example, program(s) 236 may be configured to measure, record, or otherwise obtain user information associated with a user on a daily, semi-daily, bi-daily, weekly, semi-weekly, bi-weekly, monthly, semi-monthly, bi-monthly, annual, or some other predetermined basis. As another example, program(s) 236 may be configured to measure, record, or otherwise obtain user information associated with the user whenever a certain event occurs, such as the user opening or logging into an application associated with program(s) 236 (such as an application associated with user device 102).

In some embodiments, user device 102 may transmit the baseline user information such that it can be stored at memory associated with organization 108 (e.g., database 116), or some other memory location. In some embodiments, user device 102 may transmit the baseline user information such that identification system 114, or some other device or component, can determine one or more ranges of user information, which may be based at least in part on the obtained baseline user information. In certain embodiments, the baseline user information and/or ranges of baseline user information may be stored at multiple locations (e.g., multiple memory locations may store redundant copies of the baseline user information and/or ranges of baseline user information).

Memory 230 may include one or more memory devices that store data and instructions used to perform one or more features of the disclosed embodiments. Memory 230 may also include any combination of one or more databases controlled by memory controller devices (e.g., one or more servers, etc.) or software, such as document management systems, MICROSOFT platform SQL databases, SHAREPOINT platform databases, ORACLE platform databases, SYBASE platform databases, or other relational databases. Memory 230 may include software components that, when executed by processor 210, perform one or more processes consistent with the disclosed embodiments. In some embodiments, memory 230 may include a database (e.g., database 234) for storing data to perform one or more of the processes and functionalities associated with the disclosed embodiments. The database may include data corresponding to one or more types of data or information (e.g., biometric data, merchant preferences, known associated device(s), etc.) associated with one or more users.

User device 102 may also be communicatively connected to one or more memory devices (e.g., databases (not shown)) locally or through a network. The remote memory devices may be configured to store information and may be accessed and/or managed by user device 102. By way of example, the remote memory devices may be document management systems, MICROSOFT platform SQL database, SHARE- POINT platform databases, ORACLE platform databases, SYBASE platform databases, or other relational databases. Systems and methods consistent with disclosed embodiments, however, are not limited to separate databases or even to the use of a database.

In example embodiments of the disclosed technology, user device 102 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While user device 102 has been described as one form for implementing the techniques described herein, those having ordinary skill in the art will appreciate that other functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the user device 102 may include a greater or lesser number of components than those illustrated. Some embodiments may exclude certain components discussed herein. For example, in certain embodiments, user device 102 may not include an OS, depending on the complexity of the program instructions. Embodiments not including an OS may have comparative limited functionality but may also decrease power consumption of user device 102. The various components of user device 102 may include the same or similar attributes or capabilities of the same or similar components discussed with respect to identification system 114.

Turning back to FIG. 1, organization 108 may be associated with and optionally controlled by one or more entities such as a business, corporation, individual, partnership, or any other entity that provides one or more of goods, services, and consultations to individuals such as customers. In some embodiments, organization 108 may be controlled by a third-party on behalf of another business, corporation, individual, partnership. Organization 108 may include one or more servers and computer systems for performing one or more functions associated with products and/or services that the organization provides.

Web server 110 may include a computer system configured to generate and provide one or more websites accessible to customers, as well as any other individuals involved in accessing system 100's normal operations. Web server 110 may include a computer system configured to receive communications from user device 102 via for example, a mobile application, a chat program, an instant messaging program, a voice-to-text program, an SMS message, email, or any other type or format of written or electronic communication. Web server 110 may have one or more processors 122 and one or more web server databases 124, which may be any suitable repository of website data. Information stored in web server 110 may be accessed (e.g., retrieved, updated, and added to) via local network 118 and/or network 106 by one or more devices or systems (e.g., identification system 114) of system 100. In some embodiments, web server 110 may host websites or applications that may be accessed by user device 102. For example, web server 110 may host a financial service provider website that a user device may access by providing an attempted login that are authenticated by identification system 114. According to some embodiments, web server 110 may include software tools, similar to those described with respect to user device 102 above, that may allow web server 110 to obtain network identification data from user device 102.

Transaction server 112 may include a computer system configured to process one or more transactions involving an account associated with a customer or user, or a request received from third-party (e.g., an entity associated with third-party server 104) on behalf of a customer or user who is attempting to make a purchase. In some embodiments, transactions can include, for example, a product/service purchase, product/service return, financial transfer, financial deposit, financial withdrawal, financial credit, financial debit, dispute request, warranty coverage request, and any other type of transaction associated with the products and/or services that an entity associated with organization 108 and/or third-party server 104 provides to individuals such as customers. Transaction server 112 may have one or more processors 132 and one or more transaction server databases 134, which may be any suitable repository of transaction data. Information stored in transaction server 112 may be accessed (e.g., retrieved, updated, and added to) via local network 118 and/or network 106 by one or more devices.

In some embodiments, transaction server 112 tracks and stores event data regarding interactions between a third-party, such as third-party server 104, with organization 108, on behalf of the individual (e.g., a customer or user). For example, transaction server 112 may track third-party interactions such as purchase requests, refund requests, warranty claims, account withdrawals and deposits, and any other type of interaction that third-party server 104 may conduct with organization 108 on behalf of an individual such as a customer or user.

Local network 118 may include any type of computer networking arrangement used to exchange data in a localized area, such as WIFI technology, BLUETOOTH technology Ethernet, and other suitable network connections that enable components of organization 108 to interact with one another and to connect to network 106 for interacting with components in the system 100 environment. In some embodiments, local network 118 may include an interface for communicating with or linking to network 106. In other embodiments, certain components of organization 108 may communicate via network 106, without a separate local network 118.

In accordance with certain example implementations of the disclosed technology, organization 108 may include one or more computer systems configured to compile data from a plurality of sources, for example, identification system 114, web server 110, and/or database 116. Identification system 114 may correlate compiled data, analyze the compiled data, arrange the compiled data, generate derived data based on the compiled data, and store the compiled and derived data in a database such as database 116. According to some embodiments, database 116 may be a database associated with an organization and/or a related entity that stores a variety of information relating to customers, transactions, ATM, and business operations. Database 116 may also serve as a back-up storage device and may contain data and information that is also stored on, for example, database 334, as discussed below with reference to FIG. 3.

Although the preceding description describes various functions of a web server 110, an identification system 114, and a database 116, in some embodiments, some or all of these functions may be carried out by a single computing device or a plurality of computing devices in a (cloud) serverless system.

Figure 3:
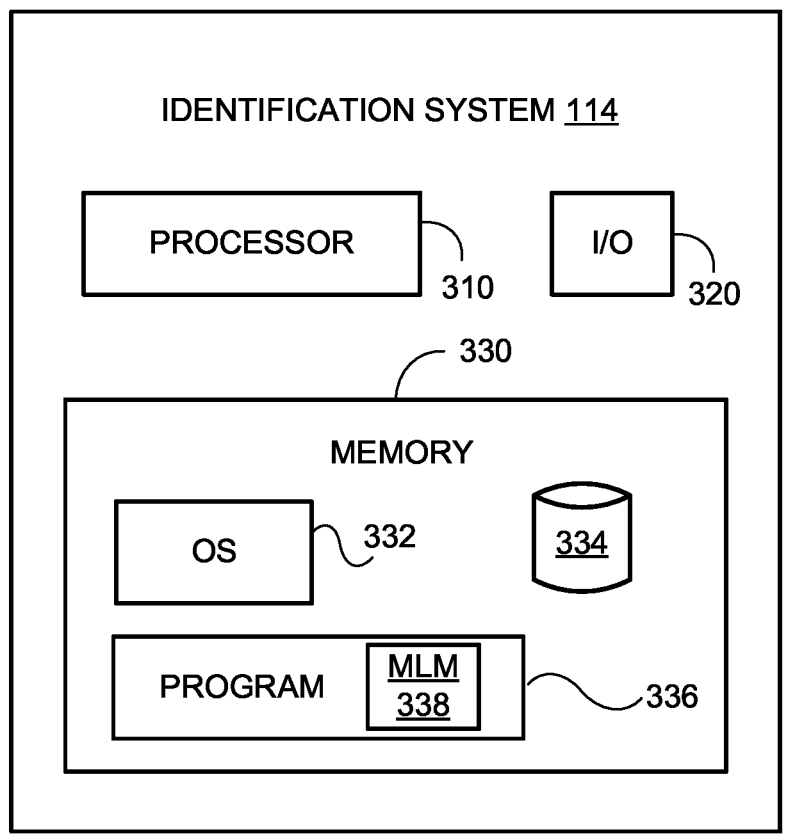
FIG. 3 is a component diagram of an example identification system, in accordance with certain embodiments of the disclosed technology.

An example embodiment of identification system 114 is shown in more detail in FIG. 3. As shown, identification system 114 may include a processor 310; an I/O device 320; and a memory 330 containing an OS 332, a storage device 334, which may be any suitable repository of data, and/or a program 336. In some embodiments, program 336 may include an MLM 338 that may be trained, for example, to receive user information (e.g., merchant preferences, biometric data, etc.), and compare the received user information to stored or previously associated user information to identify a current user. In certain implementations, MLM 338 may issue commands in response to processing an event, in accordance with a model that may be continuously or intermittently updated. Moreover, processor 310 may execute one or more programs (such as via a rules-based platform or the trained MLM 338), that, when executed, perform functions related to disclosed embodiments. According to some embodiments, user device 102 and web server 110, as depicted in FIG. 1 and described above, may have a similar structure and components that are similar to those described with respect to identification system 114 shown in FIG. 3. In some embodiments, identification system 114 may include more or fewer components than those described with respect to user device 102, and the various components of identification system 114 may include the same or similar attributes or capabilities of the same or similar components discussed with respect to user device 102.

Identification system 114 may include a computer system configured to store, maintain, and update user information (e.g., purchase history, merchant preferences, biometric data, etc.). In some embodiments, identification system 114 may store and/or maintain user information in database 116 and/or database 334. In some embodiments, identification system 114 may include default user information, which may be based on an aggregation of all user information stored in database 116 and/or database 334 (i.e., information associated with a plurality of users) or a subset of the user information stored in database 116 and/or database 334.

In some embodiments, database 116 and/or database 334 (and/or database 234, as described above with respect to FIG. 2) may include a user profile associated with one or more users. Each user profile may include, for example, purchase history, merchant preferences, associated geographic locations, known devices associated with the user, and/or biometric information such as one or more of images of the user (e.g., facial and/or body images), height, weight, walking speed, gait, other movement patterns, heartrate data, blood pressure data, hormone level data, body temperature data, retina data, iris data, pupil data, voice data (e.g., tone, pitch, rate of speech, accent, etc.), respiratory rate data (e.g., breathing rate data), brainwave data, odor/scent data (i.e., olfactory data), and sweat data (e.g., amount produced, rate of production, molecular composition). In some embodiments, a user profile may include baseline user information, as described above with respect to FIG. 2.

In some embodiments, identification system 114 may be configured to receive new user information from user device 102 such that programs(s) 336 of identification system 114 may compare the new user information to user information included in the one or more user profiles to identify a user.

Although the preceding description describes various functions of user device 102, web server 110, transaction server 112, identification system 114, database 116, and third-party server 104, in some embodiments, some or all of these functions may be carried out by a single computing device. For example, although FIG. 1 depicts identification system 114 as being present in organization 108, in some embodiments, some or all of the functionalities of identification system 114 may be carried out by user device 102.

FIG. 4 shows a flowchart of a method for identifying a secondary card user. Method 400 may be performed by some or all of user device 102, web server 110, transaction server 112, identification system 114, database 116, third-party server 104, or any useful combination thereof.

In block 402, the system (e.g., via transaction server 112) may receive transaction information associated with a transaction, the transaction information comprising an account number (e.g., a credit card number) associated with a first user (e.g., a primary account holder). That is, an organization (e.g., a financial institution) may receive information (e.g., date, time, location, merchant identifier, transaction amount, etc.) associated with a transaction conducted at a certain merchant location. The organization may receive the transaction information, e.g., by a user completing the transaction using a transaction card at a merchant point-of-sale (POS) terminal.

In decision block 404, the system (e.g., via identification system 114) may determine whether the transaction is associated with a second user. That is, the system may determine whether the transaction was conducted by a second user different from the first user (e.g., a primary account holder).

In some embodiments, the system may rely on biometric information associated with the first and second users to determine whether the transaction is associated with a second user. For example, the device used to conduct the transaction (e.g., user device 102) may be configured with one or more biometric sensors configured to detect user biometric information. The device may be configured to detect, e.g., a gait, of the user conducting the transaction. The device may be configured to transmit the detected user gait to the system, e.g., via identification system 114, such that the system may compare the detected gait to one or more gaits previously associated with the first and/or second users.

In some embodiments, the system may rely on one or more other devices known to be associated with the first and/or second users to determine whether the transaction is associated with a second user. For example, user device 102 may be configured to detect, e.g., via BLUETOOTH technology, whether any other device associated with the first and/or second user is within a recognizable or predetermined distance from user device 102. If user device 102 detects another device associated with, e.g., the second user, within a recognizable distance, user device may be configured to transmit this information to the system, e.g., via identification system 114, such that the system may determine the second user to be the user who conducted the transaction.

In some embodiments, the system may rely on other user information, for example, purchase history or merchant preferences, to determine whether the transaction is associated with a second user. For example, once the system receives the transaction information, as described above, the system (e.g., via identification system 114), may be configured to compare information pertaining to the product and/or service purchased, and/or the type of merchant involved, and compare that information to any purchase and/or merchant preference information previously associated with the first and/or second user.

The above embodiments provide the benefit of being able to identify whether a first or second user conducted a transaction associated with a certain account number. As described further below, this identification enables the system to follow up with the first user to ensure whoever conducted the transaction was permitted to do so, as opposed to a fraudster.

In block 406, responsive to determining the transaction is associated with the second user, the system (e.g., via identification system 114) may transmit a first prompt to a first user device associated with the first user, the first prompt comprising a request to confirm or deny the transaction. The first prompt may comprise, for example, a text message, an email, a push notification, or a mobile application chat message. The first prompt may be displayed via a GUI of the first user device, e.g., a mobile phone, and may comprise one or more user input objects (e.g., radio buttons, dropdown menus, etc.) such that the first user may select from "confirm" or "deny" options. This feature provides the added benefit of confirming whether the first user gave the second user permission to conduct the transaction, and in doing so, identifying a potentially fraudulent transaction if no such permission was given.

In block 408, the system (e.g., via identification system 114) may receive, via the first user device, a first user selection confirming the transaction. For example, as discussed above, the first user may select a "confirm" option via a user input object displayed on a GUI of the first user's mobile phone.

In some embodiments, the system may instead receive, via the first user device, a second user selection denying the transaction. For example, the first user may instead select a "deny" option via a user input object displayed on a GUI of the first user's mobile phone. Responsive to receiving the second user selection denying the transaction, the system (e.g., via identification system 114) may be configured to mark the transaction as indicative of potential fraud. The system may then be configured to provide further review of the marked transaction.

In decision block 410, responsive to receiving the first user selection confirming the transaction, the system (e.g., via identification system 114) may determine whether the transaction exceeds a predetermined threshold. The predetermined threshold may be, for example, a total number of transactions, a total dollar amount, etc. The purpose of the predetermined threshold is so the system may identify when a second user may have conducted enough transactions of a specific nature to be confident in recommending the second user as an authorized user of the account, as further discussed below. The predetermined threshold may be customizable by the first user (e.g., the primary account holder) and/or may be a default setting provided by a financial organization associated with the account (e.g., organization 108).

In block 412, responsive to determining the transaction exceeds the predetermined threshold, the system (e.g., via identification system 114) may transmit a second prompt to the first user device, the second prompt comprising a recommendation to designate the second user as an authorized user of the account number. The second prompt may comprise, for example, a text message, an email, a push notification, or a mobile application chat message. The first prompt may be displayed via a GUI of the first user device, e.g., a mobile phone, and may comprise one or more user input objects (e.g., radio buttons, dropdown menus, etc.) such that the first user may select from "designate" or "do not designate" options. In some embodiments, the system may be configured to cause a GUI of a mobile application associated with the first user (e.g., an online account profile) to display an alert comprising a reminder for the first user to consider designating the second user as an authorized user of the account. For example, the system may cause a GUI of an online banking account profile associated with the first user to display a reminder banner along the top of the screen such that the first user may view the reminder each time the first user logs into his or her online account. The reminder banner may be displayed for a predetermined period of time and/or the first user may be able to remove the reminder banner from the account profile display by, for example, clicking on a "dismiss" button.

In some embodiments, in response to receiving a user selection to designate the second user as an authorized user, the system may be configured to automatically designate the second user as an authorized user of the account by, for example, changing a setting in an account profile associated with the first user. In some embodiments, the system may be configured to transmit a message to the first user (e.g., via a text message, email, etc.) providing instructions as to how the first user may manually designate the second user as an authorized user of the account, for example, by logging into an online account profile associated with the first user.

FIG. 5 shows a flowchart of a method for identifying a secondary card user. Method 500 may also be performed by some or all of user device 102, web server 110, transaction server 112, identification system 114, database 116, third-party server 104, or any useful combination thereof. Method 500 is similar to method 400, except that method 500 includes causing a GUI of a mobile application associated with the first user to display an alert comprising a recommendation to designate the second user as an authorized user, rather than transmitting a second prompt to the first user to make such designation. The descriptions of blocks 502, 504, 506, 508, 510, and 512 are the same as or similar to the respective descriptions of blocks 402, 404, 406, 408, 410, and 412 and as such, are not repeated herein for brevity.

EXEMPLARY USE CASES

The following exemplary use cases describe examples of a typical user flow pattern. They are intended solely for explanatory purposes and not in limitation.

In one example, a parent may allow a child to borrow the parent's credit card such that the child may go purchase school supplies to prepare for the start of a school semester. The credit card may be configured to include one or more biometric sensors such that the credit card can detect the child's gait and movement patterns when the child carries the credit card while conducting a transaction. The credit card may be configured to transmit the detected gait and movement patterns to a server of a financial institution via a network such that the financial institution may store and review the detected gait and movement patterns. The financial institution may be able to recognize that the detected gait and movement patterns are not that of the parent, the primary account holder, based on stored gait and movement patterns previously associated with the parent. Instead, the system may recognize that the child is a second user of the credit card. The system may thus send a prompt to the parent via a push notification to the parent's mobile phone, wherein the prompt asks the parent to confirm or reject the transaction. If the parent confirms the transaction by, for example, selecting a user input on the parent's mobile phone screen, the system will understand that the child, or the second user, had the parent's permission to conduct the transaction. The system may then determine whether the child's transaction exceeds a predetermined threshold, wherein the threshold is a total number of transactions conducted by the child. For example, this predetermined threshold may be five total transactions conducted by the child using the parent's credit card. If the system determines the current transaction to be at least the sixth transaction conducted by the child using the parent's credit card, the system may send the parent a second prompt recommending the parent designate the child as an authorized user of the parent's credit card. By designating the child as an authorized user of the parent's credit card, the child may be able to begin building her own credit history as the system may continue to recognize each time the child conducts a subsequent purchase using the credit card.

In another example, a parent may allow a child to borrow the parent's credit card while the child is participating in a summer internship away from home. Upon the child using the credit card to purchase a new piece of clothing, the credit card may be configured to detect merchant information associated with the transaction (e.g., merchant name, category code, location, etc.). The credit card may be configured to transmit the detected merchant information to a server of a financial institution via a network such that the financial institution may store and review the detected merchant information. The financial institution may be able to determine the transaction was conducted by a second user by recognizing that the detected merchant information does not align with stored merchant preference information previously associated with the parent. The system may thus send a prompt to the parent via a push notification to the parent's mobile phone, wherein the prompt asks the parent to confirm or reject the transaction. If the parent confirms the transaction by, for example, selecting a user input on the parent's mobile phone screen, the system will understand that the child, or the second user, had the parent's permission to conduct the transaction. The system may then determine whether the child's transaction exceeds a predetermined threshold, wherein the threshold is a total dollar amount spent by the child using the parent's credit card. This predetermined threshold may be a total of $500, such that if the system determines the current transaction results in the total amount spent by the child using the parent's credit card exceeding $500, the system may recommend the parent designate the child as an authorized user of the parent's credit card. To make such recommendation, the system may cause a GUI of a mobile banking application associated with the parent to display a banner along the top of the screen such that the parent sees the recommendation each time the parent logs into her online banking account over the next ten days.

In some examples, disclosed systems or methods may involve one or more of the following clauses:

Clause 1: A system for identifying a secondary card user comprising: one or more processors; and a memory in communication with the one or more processors and storing instructions that, when executed by the one or more processors, are configured to cause the system to: receive transaction information associated with a transaction, the transaction information comprising an account number associated with a first user; determine, using a machine learning model, whether the transaction is associated with a second user; responsive to determining the transaction is associated with the second user, transmit a first prompt to a first user device associated with the first user, the first prompt comprising a request to confirm or deny the transaction; receive, via the first user device, a first user selection confirming the transaction; responsive to receiving the first user selection confirming the transaction, determine whether the transaction exceeds a predetermined threshold; and responsive to determining the transaction exceeds the predetermined threshold, transmit a second prompt to the first user device, the second prompt comprising a recommendation to designate the second user as an authorized user of the account number.

Clause 2: The system of clause 1, wherein the instructions are further configured to cause the system to: receive, via the first user device, a second user selection denying the transaction; and responsive to receiving the second user selection denying the transaction, mark the transaction as indicative of potential fraud.

Clause 3: The system of clause 1, wherein determining whether the transaction is associated with the second user is based on one or more of purchase history, merchant preferences, geographic area, or combinations thereof.

Clause 4: The system of clause 1, wherein the transaction is conducted during a first period of time, and wherein determining whether the transaction is associated with the second user is based on: receiving a movement pattern of a transaction card detected and transmitted by the transaction card during the first period of time; receiving a second gait of the second user detected by the transaction card based on the movement pattern of the transaction card during the first period of time; comparing the second gait of the second user and a first gait previously associated with the first user; and determining whether a comparison of the second gait of the second user and the first gait previously associated with the first user exceeds a first predetermined threshold.

Clause 5: The system of clause 1, wherein determining whether the transaction is associated with the second user is based on: receiving one or more second biometric user inputs of the second user; comparing the one or more second biometric user inputs of the second user to one or more first biometric user inputs previously associated with the first user; and determining whether a comparison of the one or more second biometric user inputs of the second user and the one or more first biometric user inputs previously associated with the first user exceeds one or more first predetermined thresholds.

Clause 6: The system of clause 1, wherein the predetermined threshold comprises a total number of transactions.

Clause 7: The system of clause 1, wherein the predetermined threshold comprises a total dollar amount.

Clause 8: The system of clause 1, wherein the instructions are further configured to cause the system to: responsive to determining the transaction exceeds the predetermined threshold, cause a graphical user interface (GUI) of a mobile application associated with the first user to display an alert comprising a reminder for the first user to consider designating the second user as the authorized user of the account number.

Clause 9: A system for identifying a secondary card user comprising: one or more processors; and a memory in communication with the one or more processors and storing instructions that, when executed by the one or more processors, are configured to cause the system to: receive transaction information associated with a transaction, the transaction information comprising an account number associated with a first user; determine, using a machine learning model, whether the transaction is associated with a second user; responsive to determining the transaction is associated with the second user, transmit a first prompt to a first user device associated with the first user, the first prompt comprising a request to confirm or deny the transaction; receive, via the first user device, a first user selection confirming the transaction; responsive to receiving the first user selection confirming the transaction, determine whether the transaction exceeds a predetermined threshold; and responsive to determining the transaction exceeds the predetermined threshold, cause a graphical user interface (GUI) of a mobile application associated with the first user to display an alert comprising a recommendation to designate the second user as an authorized user of the account number.

Clause 10: The system of clause 9, wherein the instructions are further configured to cause the system to: receive, via the first user device, a second user selection denying the transaction; and responsive to receiving the second user selection denying the transaction, mark the transaction as indicative of potential fraud.

Clause 11: The system of clause 9, wherein determining whether the transaction is associated with the second user is based on one or more of purchase history, merchant preferences, geographic area, or combinations thereof.

Clause 12: The system of clause 9, wherein the transaction is conducted during a first period of time, and wherein determining whether the transaction is associated with the second user is based on: receiving a movement pattern of a transaction card detected and transmitted by the transaction card during the first period of time; receiving a second gait of the second user detected by the transaction card based on the movement pattern of the transaction card during the first period of time; comparing the second gait of the second user and a first gait previously associated with the first user; and determining whether a comparison of the second gait of the second user and the first gait previously associated with the first user exceeds a first predetermined threshold.

Clause 13: The system of clause 9, wherein determining whether the transaction is associated with the second user is based on: receiving one or more second biometric user inputs of the second user; comparing the one or more second biometric user inputs of the second user to one or more first biometric user inputs previously associated with the first user; and determining whether a comparison of the one or more second biometric user inputs of the second user and the one or more first biometric user inputs previously associated with the first user exceeds one or more first predetermined thresholds.

Clause 14: The system of clause 9, wherein the predetermined threshold comprises a total number of transactions.

Clause 15: The system of clause 9, wherein the predetermined threshold comprises a total dollar amount.

Clause 16: A system for identifying a secondary card user comprising: one or more processors; and a memory in communication with the one or more processors and storing instructions that, when executed by the one or more processors, are configured to cause the system to: receive transaction information associated with a transaction, the transaction information comprising an account number associated with a first user; determine whether the transaction is associated with a second user; responsive to determining the transaction is associated with the second user, transmit a first prompt to a first user device associated with the first user, the first prompt comprising a request to confirm or deny the transaction; receive, via the first user device, a first user selection confirming the transaction; responsive to receiving the first user selection confirming the transaction, determine whether the transaction exceeds a predetermined threshold; and responsive to determining the transaction exceeds the predetermined threshold, transmit a second prompt to the first user device, the second prompt comprising a recommendation to designate the second user as an authorized user of the account number.

Clause 17: The system of clause 16, wherein determining whether the transaction is associated with the second user is based on one or more of purchase history, merchant preferences, geographic area, or combinations thereof.

Clause 18: The system of clause 16, wherein the transaction is conducted during a first period of time, and wherein determining whether the transaction is associated with the second user is based on: receiving a movement pattern of a transaction card detected and transmitted by the transaction card during the first period of time; receiving a second gait of the second user detected by the transaction card based on the movement pattern of the transaction card during the first period of time; comparing the second gait of the second user and a first gait previously associated with the first user; and determining whether a comparison of the second gait of the second user and the first gait previously associated with the first user exceeds a first predetermined threshold.

Clause 19: The system of clause 16, wherein determining whether the transaction is associated with the second user is based on: receiving one or more second biometric user inputs of the second user; comparing the one or more second biometric user inputs of the second user to one or more first biometric user inputs previously associated with the first user; and determining whether a comparison of the one or more second biometric user inputs of the second user and the one or more first biometric user inputs previously associated with the first user exceeds one or more first predetermined thresholds.

Clause 20: The system of clause 16, wherein the predetermined threshold comprises a total number of transactions.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for identifying a secondary card user comprising:
   one or more processors; and
   a memory in communication with the one or more processors and storing instructions that, when executed by the one or more processors, are configured to cause the system to:
   receive, from a first user via a first user device, a baseline gait by:
      receiving, from the first user via the first user device, a first indication to begin recording a first gait of the first user;
      recording the first gait of the first user over a first period of time;
      receiving, from the first user via the first user device, a second indication to stop recording the first gait of the first user; and
      responsive to receiving the second indication, ceasing recording the first gait of the first user;
   receive transaction information associated with a transaction, the transaction information comprising an account number associated with the first user, wherein the transaction is conducted during a second period of time;
   determine, using a machine learning model, whether the transaction is associated with a second user by:
      receiving a movement pattern of a transaction card detected and transmitted by the transaction card during the second period of time;
      receiving a second gait of the second user detected by the transaction card based on the movement pattern of the transaction card during the second period of time;
      comparing the second gait of the second user and the baseline gait; and
      determining whether a comparison of the second gait of the second user and the baseline gait exceeds a first predetermined threshold;
   determine whether a secondary device associated with the second user is within a predetermined distance of the transaction card;
   responsive to determining the transaction is associated with the second user and determining the secondary device is within the predetermined distance of the transaction card, transmit a first prompt to the first user device, the first prompt comprising a request to confirm or deny the transaction;
   receive, via the first user device, a first user selection confirming the transaction;
   responsive to receiving the first user selection confirming the transaction, determine whether the transaction exceeds a second predetermined threshold; and
   responsive to determining the transaction exceeds the second predetermined threshold, transmit a second prompt to the first user device, the second prompt comprising a recommendation to designate the second user as an authorized user of the account number.

2. The system of claim 1, wherein the instructions are further configured to cause the system to:
   receive, via the first user device, a second user selection denying the transaction; and
   responsive to receiving the second user selection denying the transaction, mark the transaction as indicative of potential fraud.

3. The system of claim 1, wherein determining whether the transaction is associated with the second user is based on one or more of purchase history, merchant preferences, geographic area, or combinations thereof.

4. The system of claim 1, wherein determining whether the transaction is associated with the second user is based on:
   receiving one or more second biometric user inputs of the second user;
   comparing the one or more second biometric user inputs of the second user to one or more first biometric user inputs previously associated with the first user; and
   determining whether a comparison of the one or more second biometric user inputs of the second user and the one or more first biometric user inputs previously associated with the first user exceeds one or more third predetermined thresholds.

5. The system of claim 1, wherein the second predetermined threshold comprises a total number of transactions.

6. The system of claim 1, wherein the second predetermined threshold comprises a total dollar amount.

7. The system of claim 1, wherein the instructions are further configured to cause the system to:
   responsive to determining the transaction exceeds the second predetermined threshold, cause a graphical user interface (GUI) of a mobile application associated with the first user to display an alert comprising a reminder for the first user to consider designating the second user as the authorized user of the account number.

8. A system for identifying a secondary card user comprising:
one or more processors; and
a memory in communication with the one or more processors and storing instructions that, when executed by the one or more processors, are configured to cause the system to:
receive, from a first user via a first user device, a baseline gait by:
receiving, from the first user via the first user device, a first indication to begin recording a first gait of the first user;
recording the first gait of the first user over a first period of time;
receiving, from the first user via the first user device, a second indication to stop recording the first gait of the first user; and
responsive to receiving the second indication, ceasing recording the first gait of the first user;
receive transaction information associated with a transaction, the transaction information comprising an account number associated with the first user, wherein the transaction is conducted during a second period of time;
determine, using a machine learning model, whether the transaction is associated with a second user by:
receiving a movement pattern of a transaction card detected and transmitted by the transaction card during the second period of time;
receiving a second gait of the second user detected by the transaction card based on the movement pattern of the transaction card during the second period of time;
comparing the second gait of the second user and the baseline gait; and
determining whether a comparison of the second gait of the second user and the baseline gait exceeds a first predetermined threshold;
determine whether a secondary device associated with the second user is within a predetermined distance of the transaction card;
responsive to determining the transaction is associated with the second user and determining the secondary device is within the predetermined distance of the transaction card, transmit a first prompt to the first user device, the first prompt comprising a request to confirm or deny the transaction;
receive, via the first user device, a first user selection confirming the transaction;
responsive to receiving the first user selection confirming the transaction, determine whether the transaction exceeds a second predetermined threshold; and
responsive to determining the transaction exceeds the second predetermined threshold, cause a graphical user interface (GUI) of a mobile application associated with the first user to display an alert comprising a recommendation to designate the second user as an authorized user of the account number.

9. The system of claim 8, wherein the instructions are further configured to cause the system to:
receive, via the first user device, a second user selection denying the transaction; and
responsive to receiving the second user selection denying the transaction, mark the transaction as indicative of potential fraud.

10. The system of claim 8, wherein determining whether the transaction is associated with the second user is based on one or more of purchase history, merchant preferences, geographic area, or combinations thereof.

11. The system of claim 8, wherein determining whether the transaction is associated with the second user is based on:
receiving one or more second biometric user inputs of the second user;
comparing the one or more second biometric user inputs of the second user to one or more first biometric user inputs previously associated with the first user; and
determining whether a second comparison of the one or more second biometric user inputs of the second user and the one or more first biometric user inputs previously associated with the first user exceeds one or more third predetermined thresholds.

12. The system of claim 8, wherein the second predetermined threshold comprises a total number of transactions.

13. The system of claim 8, wherein the second predetermined threshold comprises a total dollar amount.

14. A system for identifying a secondary card user comprising:
one or more processors; and
a memory in communication with the one or more processors and storing instructions that, when executed by the one or more processors, are configured to cause the system to:
receive, from a first user via a first user device, a baseline gait by:
receiving, from the first user via the first user device, a first indication to begin recording a first gait of the first user;
recording the first gait of the first user over a first period of time;
receiving, from the first user via the first user device, a second indication to stop recording the first gait of the first user; and
responsive to receiving the second indication, ceasing recording the first gait of the first user;
receive transaction information associated with a transaction, the transaction information comprising an account number associated with the first user, wherein the transaction is conducted during a second period of time;
determine whether the transaction is associated with a second user by:
receiving a movement pattern of a transaction card detected and transmitted by the transaction card during the second period of time;
receiving a second gait of the second user detected by the transaction card based on the movement pattern of the transaction card during the second period of time;
comparing the second gait of the second user and the baseline gait; and
determining whether a comparison of the second gait of the second user and the baseline gait exceeds a first predetermined threshold;
determine whether a secondary device associated with the second user is within a predetermined distance of the transaction card;
responsive to determining the transaction is associated with the second user and determining the secondary device is within the predetermined distance of the transaction card, transmit a first prompt to the first user device, the first prompt comprising a request to confirm or deny the transaction;

receive, via the first user device, a first user selection confirming the transaction;

responsive to receiving the first user selection confirming the transaction, determine whether the transaction exceeds a second predetermined threshold; and responsive to determining the transaction exceeds the second predetermined threshold, transmit a second prompt to the first user device, the second prompt comprising a recommendation to designate the second user as an authorized user of the account number.

15. The system of claim 14, wherein determining whether the transaction is associated with the second user is based on one or more of purchase history, merchant preferences, geographic area, or combinations thereof.

16. The system of claim 14, wherein determining whether the transaction is associated with the second user is based on:

receiving one or more second biometric user inputs of the second user;

comparing the one or more second biometric user inputs of the second user to one or more first biometric user inputs previously associated with the first user; and determining whether a comparison of the one or more second biometric user inputs of the second user and the one or more first biometric user inputs previously associated with the first user exceeds one or more third predetermined thresholds.

17. The system of claim 14, wherein the second predetermined threshold comprises a total number of transactions.

* * * * *